US 6,532,879 B2

(12) United States Patent　　(10) Patent No.:　　US 6,532,879 B2
Abrams　　(45) Date of Patent:　　Mar. 18, 2003

(54) GASIFIER SYSTEM AND METHOD

(75) Inventor: Stan E. Abrams, Castle Rock, CO (US)

(73) Assignee: Nathaniel Energy Corporation

( * ) Notice: Subject to any disclaimer, the term of this patent is extended or adjusted under 35 U.S.C. 154(b) by 0 days.

(21) Appl. No.: 10/061,362

(22) Filed: Feb. 4, 2002

(65) Prior Publication Data

US 2002/0174811 A1 Nov. 28, 2002

Related U.S. Application Data

(62) Division of application No. 09/138,020, filed on Aug. 21, 1998, now abandoned.

(51) Int. Cl.[7] .............................. F23N 5/18; F23N 5/00; F23M 5/06
(52) U.S. Cl. ....................... 110/188; 110/214; 110/235; 110/251; 110/255; 110/270; 110/331
(58) Field of Search .................... 110/186, 188, 110/214, 235, 251, 252, 255, 257, 268, 269, 270, 288, 229, 250, 293, 298, 299, 300, 331, 346, 348, 233

(56) References Cited

U.S. PATENT DOCUMENTS 4,109,590 A * 8/1978 Mansfield .................. 110/235
4,119,046 A * 10/1978 Adams .................... 110/297 X
4,263,857 A * 4/1981 Ban ........................ 110/348 X
4,624,192 A * 11/1986 Mansfield ............... 110/270 X
4,765,256 A * 8/1988 Caughey .................... 110/229
5,284,103 A * 2/1994 Hand et al. ................. 110/255
5,657,706 A * 8/1997 Liagre et al. ............... 110/250

* cited by examiner

Primary Examiner—Ljiljana Ciric
(74) Attorney, Agent, or Firm—Jim Zegeer

(57) ABSTRACT

A solid fuel fed combustor system having a first chamber portion with an inlet feed for feeding a metered amount of a solid fuel thereto, a first burner stage having a first traveling conveyor firebelt, a metered amount of air introduced in progressively increasing proportions along the length of the first traveling conveyor. A second burner stage having a second traveling conveyor firebelt with air introduced in a progressively decreasing amount along the length of said second traveling conveyor firebelt and a controller for controlling air introduced to the system. The chamber has a sloped common roof section common to the burner stages and is made of radiative energy reflective fire brick and angled to reflect radiative energy generated from fuel traveling on the traveling conveyor firebelts and directing the radiative energy on fuel traveling on the first firebelt.

3 Claims, 7 Drawing Sheets

GASIFIER SYSTEM AND METHOD

REFERENCE TO RELATED APPLICATION

The present application is a continuation of application Ser. No. 09/138,020, filed Aug. 21, 1998, entitled GASIFIER SYSTEM AND METHOD (now abandoned).

BACKGROUND AND BRIEF DESCRIPTION OF THE INVENTION

This invention relates to gasifier systems and methods for the efficient conversion of solid fuels to usable heat energy.

DESCRIPTION OF THE PRIOR ART

The prior art is best exemplified by U.S. Pat. No. 5,284,103 entitled BIO-MASS BURNER CONSTRUCTION by Hand et al, which is a division of U.S. Pat. No. 5,178,076 entitled BIO-MASS BURNER CONSTRUCTION issued Jan. 12, 1993 to the same inventors. In these patents, the burner utilizes a first burning chamber having a falling fuel entrained bed zone positioned above a traveling grate having a porous metallic woven belt. Primary air is directed through the porous belt to establish an oxygen-starved first burning chamber. A second burning chamber in fluid communication with the first burning chamber has a restricted diameter and effectively provides a hot-air gas nozzle. In larger sized units, a plurality of conveyors constitutes the traveling grate with the conveyors being arranged in head-to-head stepped relationship so that unburned fuel received by gravity from the entrained bed zone is agitated or jostled to enhance its burning.

SUMMARY OF THE INVENTION

According to the present invention, firebelts ensure that the heat loss from heating unnecessary air is minimized. The quantity of air at each point in the combustion process is stringently controlled. This air control benefits the combustion process in three ways:

First, by minimizing the heat loss of the combustion process, this minimizes the amount of carbon monoxide which is produced. Carbon monoxide, a priority pollutant, is produced directly proportional to the combustion temperature. Therefore, by minimizing excess air, the quantity of carbon monoxide produced is minimized.

Secondly, nitrogen oxides, another priority pollutant, is produced by combining the nitrogen in the air with the oxygen in the air. This combination of nitrogen and oxygen only occurs at high temperatures. The higher the temperature, the greater the quantity of nitrogen oxides that are produced. While the combustor of the present invention utilizes high temperatures, the formation of nitrogen and oxides is minimized since there is no excess oxygen to combine with the nitrogen. All the oxygen is used in the combustion process.

Thirdly, by minimizing the amount of air supplied to the combustion process, the amount of energy required to move air to the combustor is minimized. Electrical energy costs are typically 20% less than similar combustion systems where the air is not stringently controlled.

A further feature of the present invention is in the use of reflected infrared energy. Heat is a form of electromagnetic energy similar to light where the rays can be refracted or reflected. Radiation produced from heat is of a longer wavelength than visible light and is called infrared rays. By reflecting a certain amount of the heat produced from a combustion process, this invention is able to supply heat to the gasification process. The reflected heat will be of benefit in two ways:

Firstly, the heat is reflected to a point where the heat can be used to assist the combustion process. This is generally where the fuel first enters the combustion process. At this point, the fuel must be heated and the water removed. These processes require addition of energy which can be added for heat of the combustion of a part of the fuel or from the reflected energy. Using a part of the fuel to preheat the remaining fuel is inefficient, leaving less total heat available for production of electricity. Using reflected heat removes or minimizes this inefficiency. The second way this benefits the overall combustion process is in that the energy is transferred in a beneficial way—not wasted by irradiating and heating in the combustion chamber. Heat that is absorbed by the combustion chamber is generally wasted since there is no direct benefit from this radiation. A small portion is used in the maintenance of the necessary combustion temperature but the majority of irradiating heat is wasted as low-level heat irradiating from the combustor exterior. Reflective heat added to the fuel will benefit the overall combustion efficiency, and this is a feature of the present invention.

Another feature of the invention is that the speed of the conveyor drive and the rate of inlet air and the control of inlet air is much more closely controlled so as to achieve high efficiency. Still another feature of the invention is that the fuel feed ramping is based on thermal conditions at the boiler output.

Still another feature of the invention is that the induced draft fan control is based on the draft pressure and boiler airflow rate.

Still another feature of the invention is in the method to control catalyst feed levels based on pollutant levels in the stack as measured at a continuous emission monitoring system point.

Finally, the invention features a control system which is based on operational parameters sensed at different stages in the process.

Accordingly, the object of the invention is to provide an improved gasifier system.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
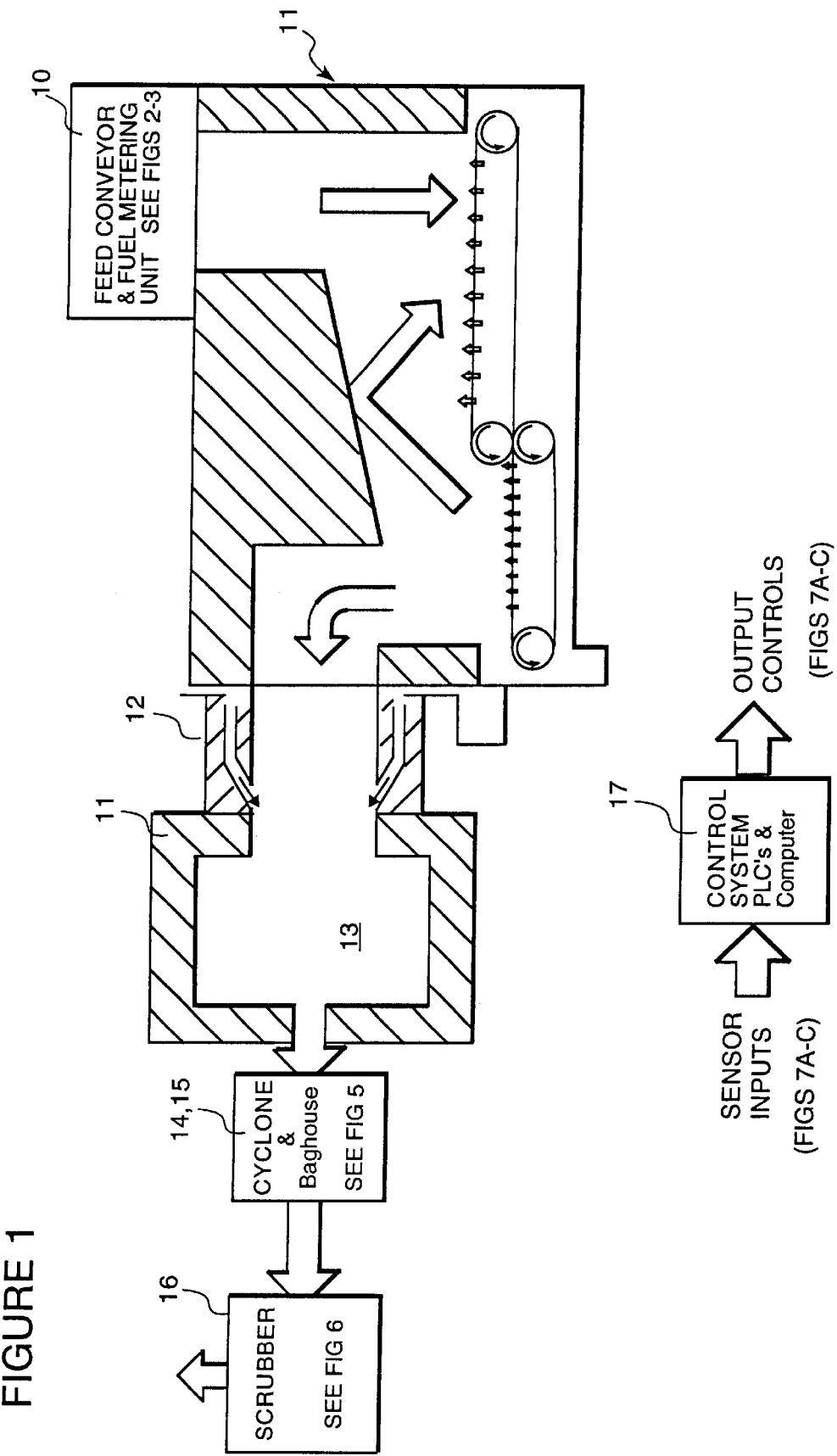
FIG. 1 is a diagrammatic sectional illustration of a gasifier system incorporating the invention.
Figure 7A:
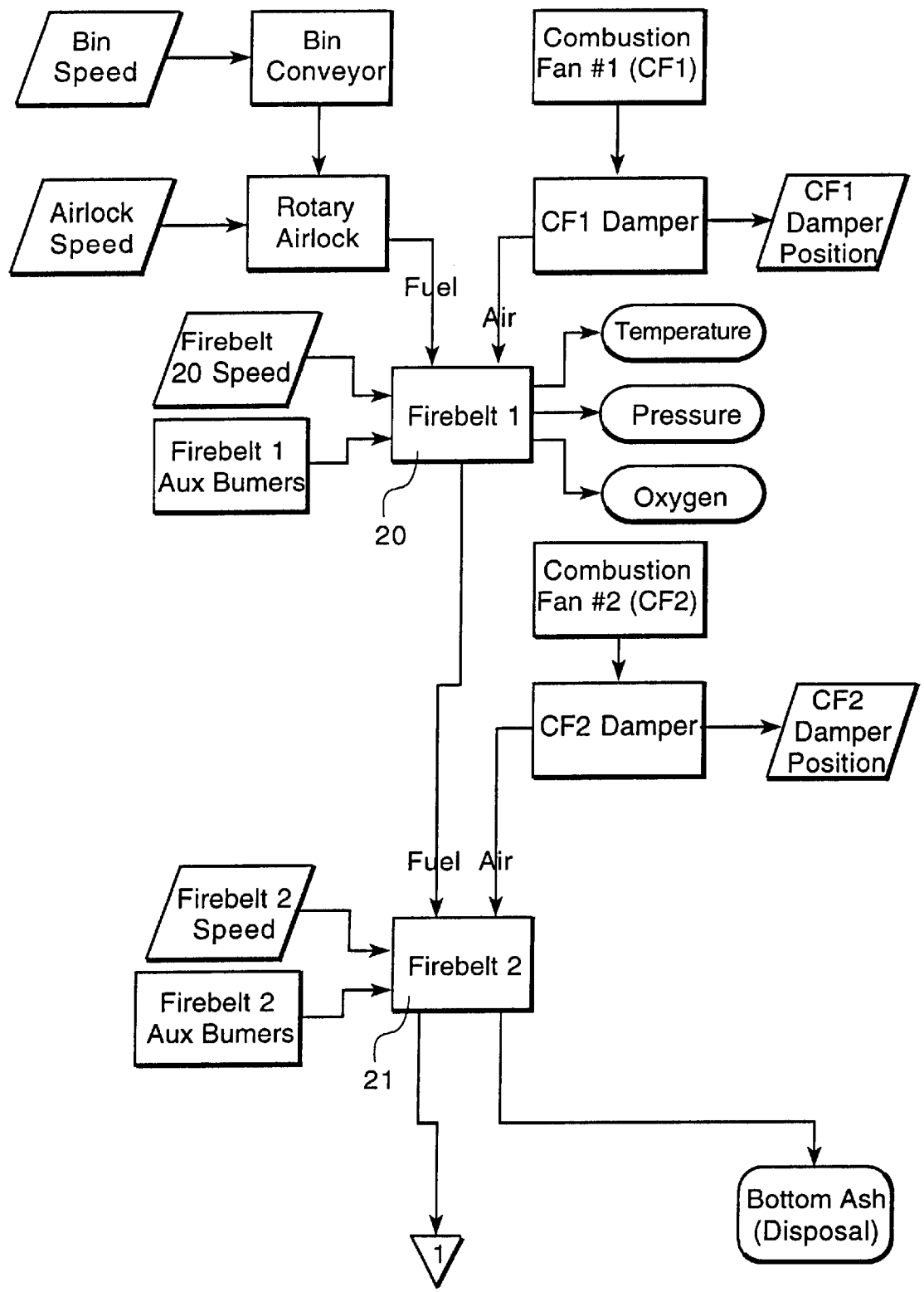
FIGS. 7A, 7B and 7C are flow diagrams illustrating the combustion process and location of various sensors and control elements incorporated in the invention.
Figure 7B:
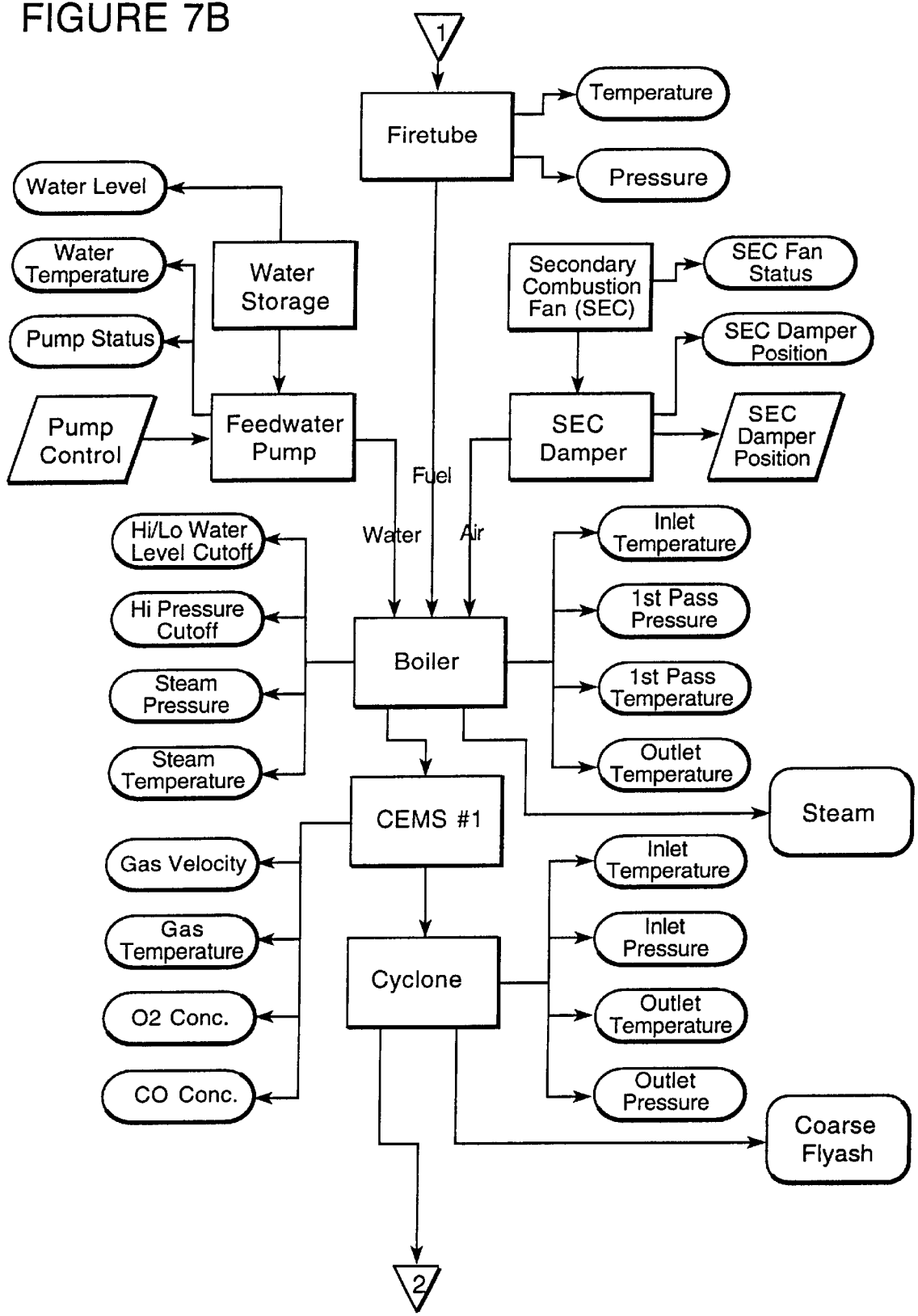
Figure 7C:
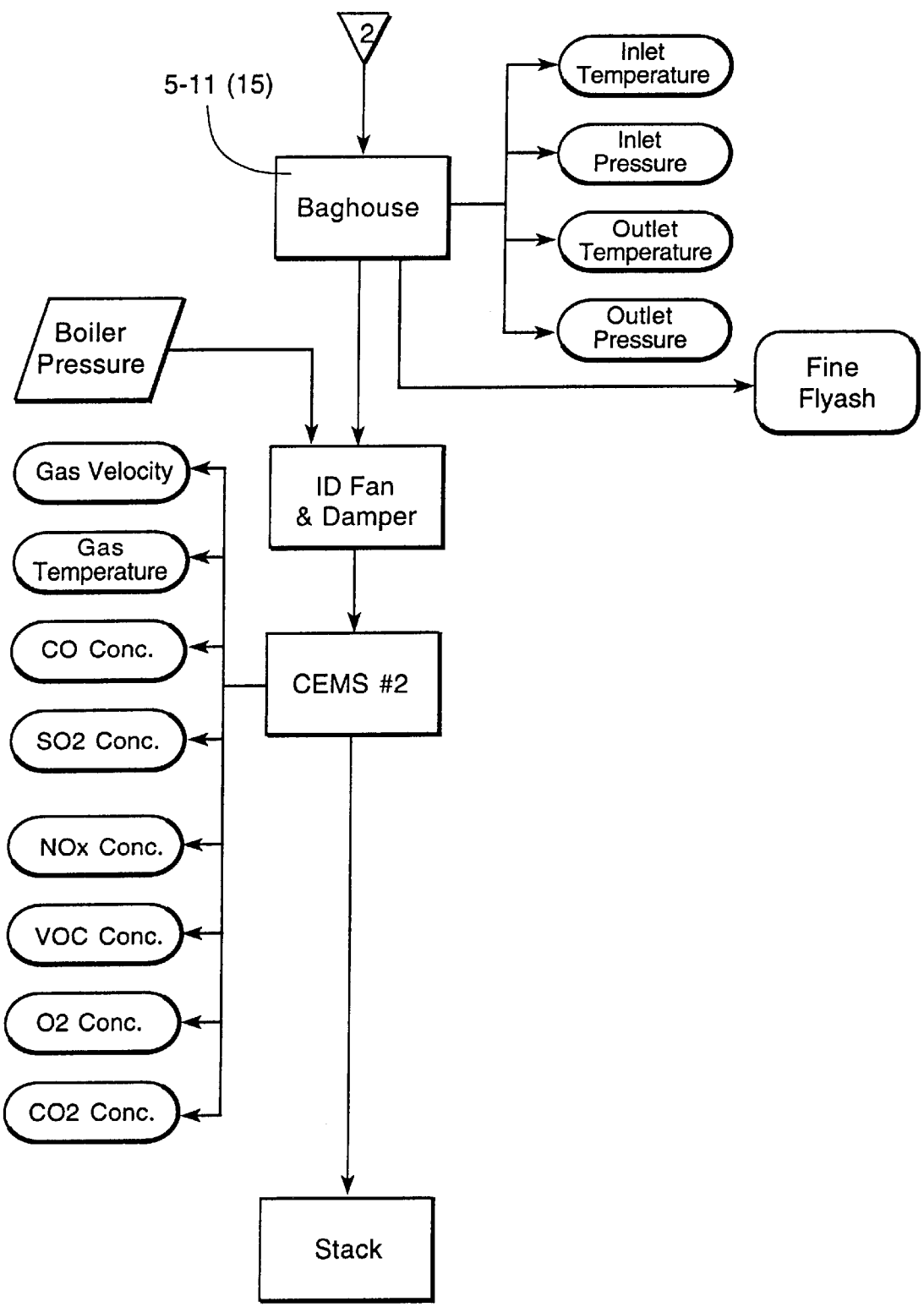

Referring now to FIG. 1, the gasifier system comprises an inlet feed conveyor and fuel metering unit 10, a gasifier 11, a gasifier firetube with connection to boiler 12, the boiler itself 13, a cyclone 14, baghouse 15, scrubber 16, and control system 17 which control system is diagrammatically illustrated in FIGS. 7A, 7B and 7C.

Inlet Feed Conveyor with Fuel Metering Unit 10

This section delivers the prepared fuel to the gasifier. It includes the bin conveyor and rotary airlock. The control system determines the required fuel flow for proper gasification and the quantity to sustain the output of steam from the boiler. It then determines the required speed of the conveyor and the airlock.

Figure 2:
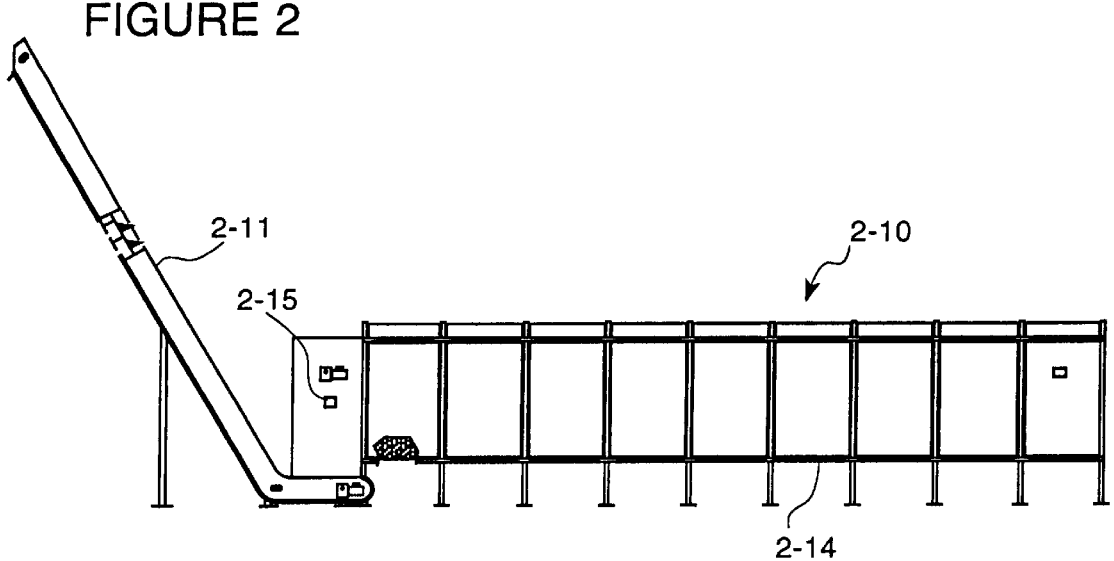
FIG. 2 is a cross-sectional illustration of a walking floor trailer and inclined conveyor incorporated in the invention for feeding fuel to the combustor unit.

Walking Floor Trailer and Inclined Conveyor (FIG. 2)

The walking floor trailer 2-10 is used to store and deliver fuel to the combustor with the inclined conveyor. The bin conveyor 2-12 monitors the amount of fuel and calls for additional fuel from the walking floor trailer when necessary.

The walking floor trailer 2-10 works in the following manner: The floor 2-14 is comprised of a number of strips that independently move. To move the fuel to the rear of the trailer (left end in FIG. 2), the strips all move together rearward. At the end of the cycle (approximately four inches), each strip independently moves forward, leaving the fuel undisturbed. This cycle is repeated as required to move the fuel rearward as much as necessary. A monitor or sensor 2-15 is located at the input end of inclined conveyor 2-11. The inclined conveyor 2-11 monitors the quantity of fuel located at the end of the trailer (the beginning of the inclined conveyor) and moves the fuel rearward in the walking floor trailer as required to maintain sufficient fuel in the inclined conveyor.

Bin Feeder and Rotary Air Lock

Figure 3:
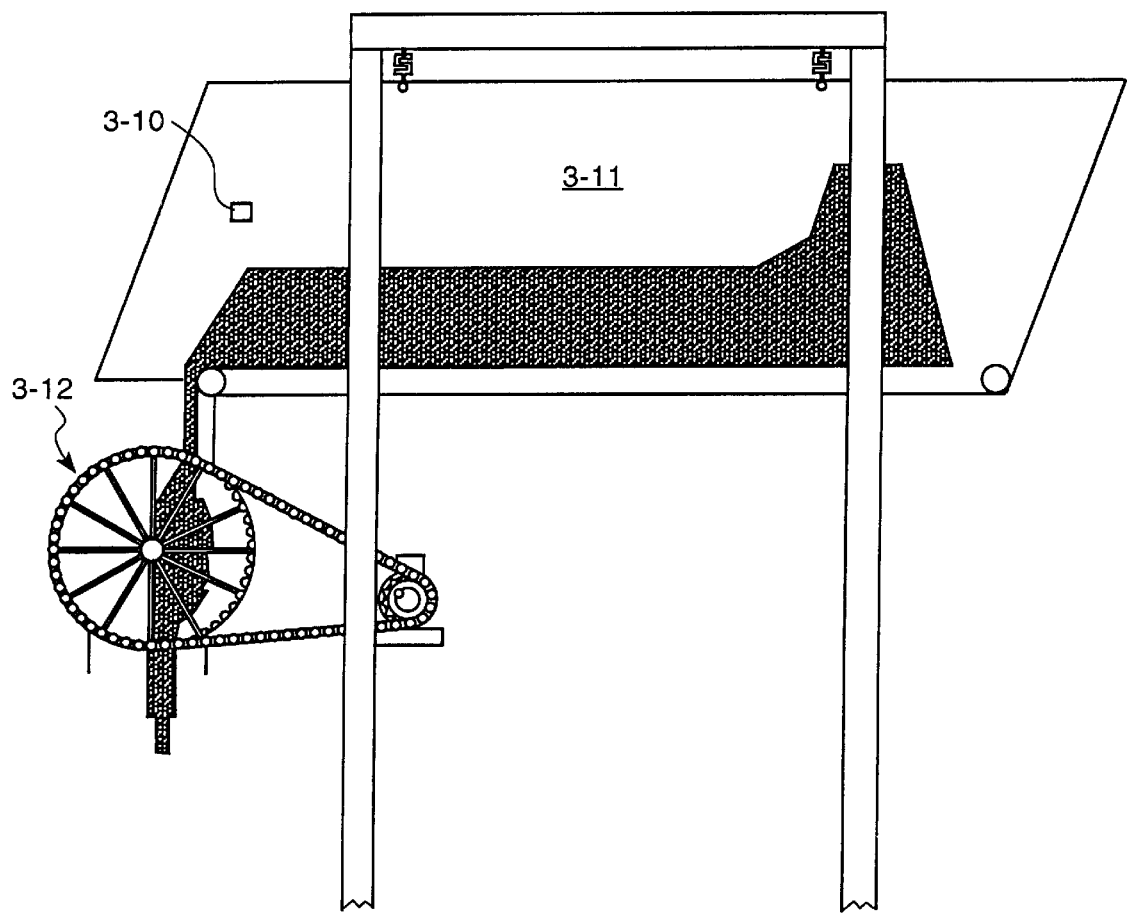
FIG. 3 is a diagrammatic illustration of the bin feeder and rotary air lock incorporated in the invention.

The bin feeder (FIG. 3) receives the fuel from the inclined elevator 2-11 (FIG. 2). The bin feeder is used to meter the fuel to the combustor. Depending upon the quantity of fuel required by the combustor to produce sufficient stream, the bin feeder 3-11 speed will be varied to introduce sufficient fuel to the combustor. A sensor 3-10 is used on the bin feeder to ensure that sufficient fuel is present on the bin feeder belt. If additional fuel is needed, a signal is sent to the inclined conveyor/walking floor trailer (FIG. 2) for additional fuel.

The rotary air lock 3-12 is used to provide a mechanical seal to minimize the quantity of unwanted air introduced into the combustor.

Gasifier 11

The fuel gasification process takes place in gasifier 11 shown in FIG. 1. device. This process is described hereafter in the section entitled "COMBUSTION PROCESS DESCRIPTION". The area of this gasification is referred to as stage 1. The gasification in this stage is controlled totally by the control system by taking the following parameters and the system computer determines the variables that need to change or remain the same during the gasification process:

Stage 1a:
Solid fuel feed rate,
Airflow rate,
Oxygen concentration,
Firebelt 20 speed,
Gasification temperature,
Draft pressure.
Stage 1b:
Air flow rate,
Oxygen concentration,
Firebelt 21 speed,
Oxidation temperature,
Draft pressure.

Firebelt (Conveyor) Air Flows

The variable control of air through the firebelts (conveyors) 20, 21 is the primary reason for the extremely low air emissions from the combustor disclosed herein. Controlling the amount of air that passes through each unit area of the firebelts governs the quantity and quality of the combustion process.

The combustion process requires two components; fuel and an oxidizer. Normally, air is used as an oxidizer but air contains many gases, most of which do not contribute to the oxidation process. In fact, the other gases in air can have a deleterious effect on the overall combustion efficiency.

The entire combustion process is a series of discrete steps where heat is either created or it is used. In general, the following steps occur in the solid fuel combustion process:

Firebelt 20

| | |
|---|---|
| Heat solid fuel to operating temperature | requires energy |
| Remove adsorbed water from solid fuel | requires energy |
| Heat combustion air to operating temperature | requires energy |
| Gasify fuel components in solid fuel | requires energy |
| Decompose fuel gases into elemental fuels | requires energy |
| Reflected heat from firebelt 21 | produces energy |
| Combust small percentage of solid fuel for heat | produces energy |
| | Net energy: Produces very little energy |
| | Heat loss: Negligible |

Firebelt 20

| | |
|---|---|
| Heat combustion air to operating temperature | requires energy |
| Additional heating of fuel and ash from 1,500° F. to 2,500° F. | requires energy |
| Reflect heat to firebelt 20 | requires energy |
| Combust carbon into carbon monoxide | produces energy |
| Preheat air from hot bottom ash | produces energy |
| | Net energy: Produces little energy |
| | Heat loss: Small - from hot bottom ash |

Firetube 12

| | |
|---|---|
| Heat combustion air to operating temperature | requires energy |
| Additional heating of fuel and ash from 2,500° F. to 4,000° F. | requires energy |
| Combust fuels | produces energy |
| Preheat combustion air from combustor refractory | produces energy |
| | Net energy: Produces significant energy |
| | Heat loss: Negligible |

Boiler Superheater

| | |
|---|---|
| Heat transferred to steam | requires energy |
| | Net energy: Requires significant energy |
| | Heat loss: Negligible |

Boiler 11

| | |
|---|---|
| Heat transferred to boil water | requires energy |
| | Net energy: Requires significant energy |
| | Heat loss: Negligible |

Boiler Preheater

| | |
|---|---|
| Heat transferred to water | requires energy |
| | Net energy: Requires significant energy |
| | Heat loss: Negligible |

Cyclone 14

| | |
|---|---|
| Heat lost via radiant heating | produces energy |
| Heat lost in fly-ash | produces energy |
| | Net energy: Produces unusable energy |
| | Heat loss: Significant |

-continued

Baghouse 15

| | |
|---|---|
| Heat loss via radiant heating | produces energy |
| Heat lost in fly-ash | produces energy |
| | Net energy: Produces unusable energy |
| | Heat loss: Significant |

Stack Fan

| | |
|---|---|
| Heat lost via radiant heating | produces energy |
| Heat lost in atmosphere | produces energy |
| | Net energy: Produces unusable energy |
| | Heat loss: Significant |

Heat Balance

| | |
|---|---|
| Heat Produced | 100% |
| Heat used to produce steam | 82% |
| Heat loss through radiant convection | 5% |
| Heat loss discharge to atmosphere | 11% |
| Heat loss from ash | 2% |
| Heat loss through combustor, fire tube and boiler | <0.001% |

To ensure that the heat loss from heating unnecessary air is minimized, the quantity of air at each point of the combustion process is stringently controlled. This air control benefits the combustion process in three ways.

The first way is by minimizing the heat loss in the combustion process. This minimizes the amount of carbon monoxide produced. Carbon monoxide, a priority pollutant, is produced directly proportional to the combustion temperature. Therefore, by minimizing excess air we minimize the quantity of carbon monoxide.

Second, nitrogen oxides, another priority pollutant, is produced by combining the nitrogen in air with the oxygen in the air. This combination of nitrogen and oxygen only occurs at high temperatures. The higher the temperature, the greater the quantity of nitrogen oxides that is produced. While the combustor disclosed herein utilizes very high temperatures, the formation of nitrogen oxides is minimized since there is no excess oxygen to combine with the nitrogen. All of the oxygen is used in the combustion process.

Third, by minimizing the amount of air supplied to the combustion process, this also minimizes the amount of energy required to move the air to the combustor. Electrical energy costs are typically 20% less than similar combustion systems where the air is not stringently controlled.

Reflection of Infrared Energy

Heat reflection is another innovative feature of the combustor of this invention. Heat is a form of electromagnetic energy, similar to light where the rays can be refracted or reflected. Radiation produced from heat is of a longer wavelength than visible light and is called infrared rays.

By reflecting a certain amount of the heat produced from the combustion process, we can supply additional heat to the gasification process. The reflected heat will be of benefit in two ways:

The first way is that by the heat reflected to a point where the heat can be used to assist the combustion process. This is generally where the fuel first enters the combustion process. At this point, the fuel must be heated and the water removed. These processes require the addition of energy which can be added from either the combustion of a part of the fuel or from the reflected energy. Using a part of the fuel to preheat the remaining fuel is inefficient, leaving less total heat available for the production of electricity. Using the reflected heat removes or minimizes this inefficiency.

The second way reflected heat benefits the overall combustion process is that the energy is transferred in a beneficial way and is not wasted by irradiating and heating the combustion chamber. Heat that is absorbed by the combustion chamber is generally wasted since there is no direct benefit from this radiation. A small portion is used in the maintenance of the necessary combustion temperature, but the majority of the radiative heat is wasted as low level heat radiated from the combustor exterior. The reflection of the heat back onto the fuel will benefit the overall combustion efficiency.

Gasifier Firetube with Connection to Boiler 12

This is actually a part of the gasifier and is referred to as stage 2. It is the connecting tube to the boiler 13. Outside ambient air is preheated between outer skins of the gasifier and injected at a rate controlled by the control system. When this oxygen rich air meets the gas from the gasifier, ignition takes place in the firetube and thus enters the boiler. The following parameters are taken in the firetube for the control system's use:

Stage 2:
Air flow rate,
Oxygen concentration,
Carbon dioxide concentration,
Carbon monoxide concentration,
Firetube draft pressure,
Firetube temperature,
Boiler draft pressure,
Boiler temperature.

Boiler 13 (See FIG. 7B)

Figure 4:
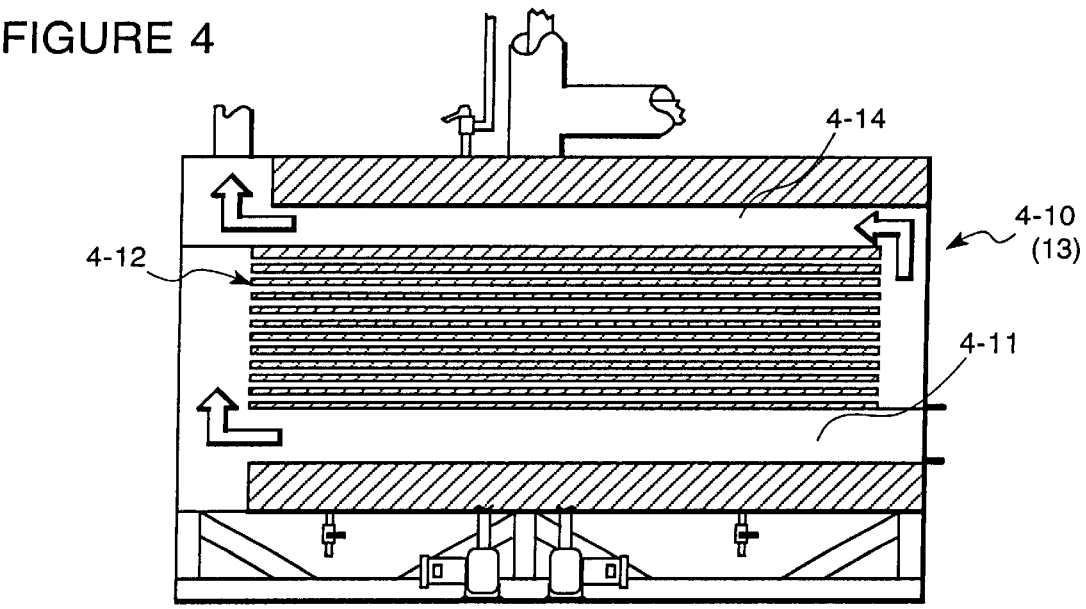
FIG. 4 is a diagrammatic illustration of the boiler for converting thermal energy to steam.

The boiler 13 (FIG. 4) converts the thermal energy to steam. The following parameters (see FIG. 7B) are taken in the boiler for the control system use for control of the feed rate and the steam output:

Air flow rate,
Steam pressure,
Steam temperature.

The boiler 4-10 (13) used in this embodiment of the invention is of the Scotch Marine Type of boiler. Other types of boilers such as A-frame, H-frame may be used in other installations.

The boiler 4-10 absorbs the heat produced from the combustion of the fuel and transfers it to water, which is converted into steam. The steam is used to produce mechanical work such as electrical generation, heating, etc.

The Scotch Marine Boiler is a three-pass type of boiler. The first pass is through a large diameter central tube 4-11. Approximately 40% of the usable heat is absorbed during the first pass. This heat is used to heat the water and to convert part of the water into steam. The second pass is in the reverse direction through a series of small tubes 4-12. An additional 40% of the usable heat is absorbed during the second pass. The remaining water is converted into steam by the heat absorbed during the second pass. The third pass is again through a large diameter tube 4-14 where the remaining 20% of the heat is absorbed. This heat is used to, in essence, superheat the steam and ensure that no liquid water remains.

An economizer may be attached after the boiler to preheat the water and improve efficiency. This is not shown in this embodiment.

Cyclone 14

Figure 5:
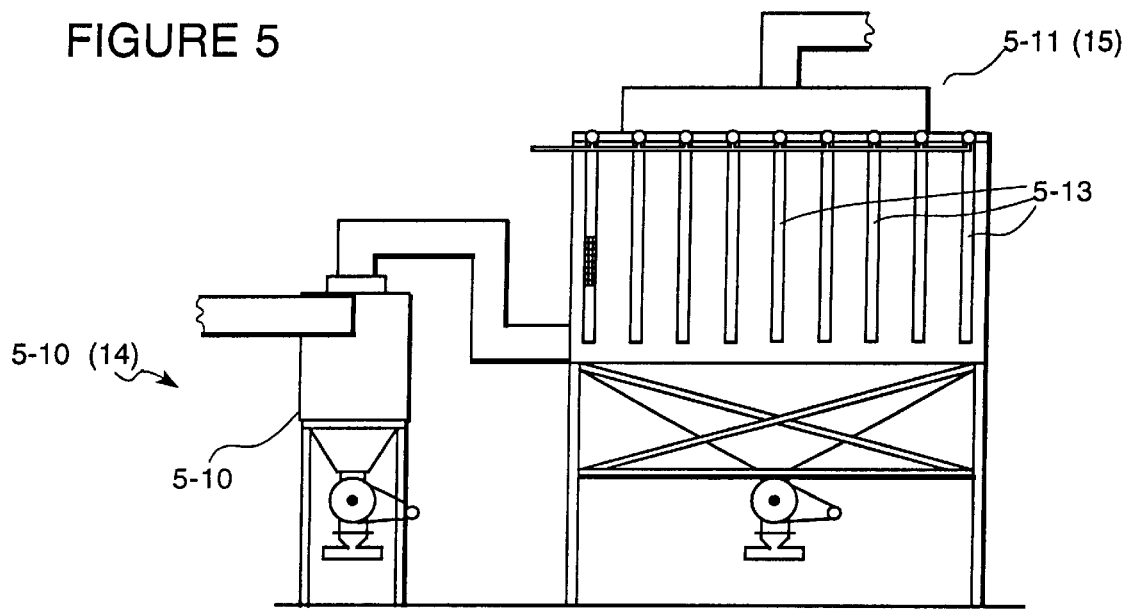
FIG. 5 is a diagrammatic illustration of the cyclone and baghouse particulate collection division.

The cyclone 14 (FIG. 5) is the first mechanical device that removes particulate. The design of the cyclone is such that when the air flows through it from the boiler the largest particulate will drop from the airflow through the bottom of the cyclone to a storage container. The following parameters are measured (see FIG. 7B) for the control system 17 in the cyclone:

Inlet temperature,

Inlet pressure,

Outlet temperature,

Outlet pressure.

The cyclone 5-10 and baghouse 5-11 operate as particulate collection devices. In the combustion process, as the fuel is combusted a small percentage of ash remains. Some of this ash is entrained within the combustion air stream and is carried along with the exhaust gases, called fly-ash. The cyclone 5-10 and baghouse 5-11 remove the fly-ash so that it is not emitted into the atmosphere.

The cycle acts through centripetal action. The gas spins around in the cyclone and separates the heavy particles from the gas based upon weight. The ash particles are collected at the bottom of the cyclone and removed through a rotary air lock and a vacuum removal system (eductor).

The baghouse operates on a different principle. The gas passes through a series of fiberglass bags 5-13 that have very small openings within them. The gas can pass through but the particles cannot and remain adsorbed to the exterior of the bag. At appropriate intervals, high-pressure air is introduced inside the bags. This air literally forces the particles off of the bags and they fall to the bottom of the baghouse. The particles then are collected through a rotary air lock and an eduction system similar to the cyclone.

Baghouse 15

The baghouse 15 (FIG. 5) is the final removal equipment for particulate. The mesh size of the bags will be determined by the particulate discharge requirements. The following parameters are taken in the baghouse for the control system use:

Inlet temperature,

Inlet pressure,

Outlet temperature,

Outlet pressure.

Figure 6:
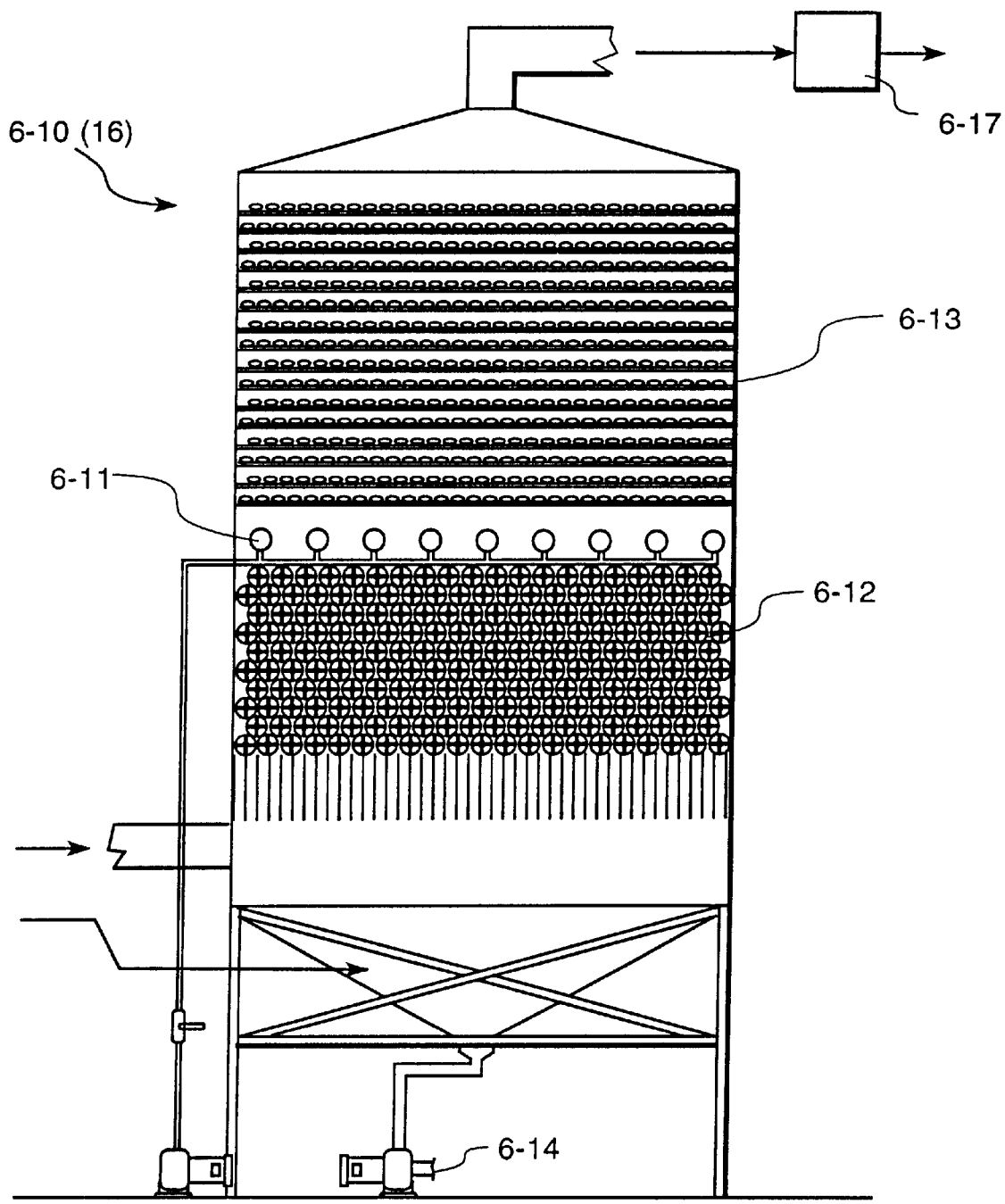
FIG. 6 is a diagrammatic illustration of the scrubber for removing acid gases from the exhaust gas stream.

Scrubber (FIG. 6)

The scrubber 6-10 is used to remove acid gases from the exhaust gas stream. A mixture of lime (calcium oxide, a strong caustic) and water is sprayed 6-11 through the exhaust gas. This liquid chemically reacts with the acid gases such as sulfur dioxide, hydrogen chloride, etc. to remove the acid gases. Plastic or ceramic open-frame balls are often used as packing to increase the surface area of the contact surface to improve the efficiency of the chemical reaction. After the liquid has reacted with the gas, the gas stream passes through a series of impediments, called demisters 6-13 to remove all excess liquid. The gas then proceeds to the stack exhaust fan where the clean exhaust gas is vented to the atmosphere.

After the liquid has reacted with the acid gases, it is collected in a spent slurry collector and returned for treatment to a source by pump 6-14 in the bottom of the scrubber where it is pumped to a separation chamber and the lime solution recycled.

The scrubber 6-10 (FIG. 6) cleans the bad gases from the air stream before discharge to the atmosphere. It is usually a wet or dry lime injection system depending on the discharge requirements. The following parameters are taken for the control system that then determines the feed rate for the catalytic agent:

Particulate (opacity),

Sulfur dioxide,

Nitrogen oxides,

Carbon monoxide,

Volatile organic carbon,

Certain hydrocarbon species,

Hydrogen chloride,

Hydrogen fluoride,

Hydrogen sulfide.

Cleaned exhaust gases are fed by fan 6-17 to the exhaust stack.

Control System 17

The control system (see flow charts in FIGS. 7A, 7B and 7C) is the determining factor for the gasification system to operate properly and to be in compliance with the regulatory requirements for air discharge. It includes Programmable Logic Controllers (PLC's) and variable speed drives, diagrammatically illustrated in FIGS. 7A, 7B and 7C, that operate the various motors, fans and drives that operate the gasifier system. The PLC'S are in turn controlled by signals from a computer that is programmed to recognize all the variables listed plus other minor items and to react properly from the data base. The program is designed to make adjustments for different types of fuels (with different BTU content) without changing equipment in the gasifier system.

Combustor Process Description

Thermodynamic Extraction of Chemical Potential Energy

The release of chemical potential energy is a two-stage process: Stage 1 gasifies the carbon-based solid fuels and Stage 2 oxidizes the gasified fuels to produce heat.

Stage 1 is subdivided into two separate processes involved in the gasification of solid fuels. Stage 1a uses thermal decomposition of the solid fuel introduced into the combustor to break the fuel into gaseous fractions of lower molecular weight or elemental composition. All absorbed compounds in the fuel such as water and other solvents are released in this stage.

A polymerized hydrocarbon based fuel (both plastic and lignin/cellulose base fuel) is decomposed into short chain aliphatic hydrocarbons, elemental carbon, carbon monoxide and hydrogen through the addition of energy as heat. Other elemental based polymers including sulfur and silicon based compounds are similarly broken into appropriate monomers or elements using the same process. The ash produced from Stage 1a is largely carbon with small amounts of metal oxides.

The heat required for the endothermic decomposition of the fuel is produced from heat supplied from stage 1b and from limited oxidation of fuel in stage 1a. The oxidation of the solid fuel is limited in this stage by careful control of air added to the combustion process in Stage 1a. The amount of air injected into Stage 1a is controlled by the amount of oxidation required to maintain the minimum necessary decomposition temperature in this stage.

Stage 1b utilizes an exothermic partial oxidation of the carbon in the ash to produce carbon monoxide and heat. The remaining solid ash consists entirely of metallic oxides. The reaction in Stage 1b is limited to partial oxidation of the carbon by controlling the air injected into Stage 1b.

The heat of reaction of the carbon oxidation is used in Stage 1a to decompose the fuel as previously described. Approximately 80% of the heat of reaction is utilized in this process with the remaining heat passing to Stage 2.

Physical Process

Solid fuel is introduced to the combustor section 1a (firebelt 20) where gasification and moisture removal occurs. A minimal amount of air is introduced to Section 1a to maintain the minimum gasification temperature necessary for the specific type of fuel used. Radiative energy from Section 1b, firebelt 21 also added to the energy required for gasification.

The gases exiting this section consist of primarily carbon monoxide, hydrocarbons (short-chain and long-chain) and water vapor with minimal quantities of carbon dioxide and the balance of nitrogen. The ash produced through the gasification process consists of carbon, long-chain, high-boiling-point hydrocarbons and metallic oxides.

Control of the gasification process is accomplished by modulation of the fuel feed rate, the quantity of air introduced through firebelts as measured by the oxygen concentration, the gasification temperature and the speed of the firebelts. Air injected into the solid fuel is minimized to prevent quenching of the air/fuel reaction and to prevent complete oxidation of carbon to carbon dioxide. The firebelt speed is controlled so that the solid fuel has been completely gasified at the end of the belt.

The carbon ash from firebelt 20 falls onto section 1b (firebelt 21) where additional air, in decreasing quantities, is supplied to combust the carbon to carbon monoxide as well as decomposition of the long-chain hydrocarbons to carbon monoxide and hydrogen. Section 1b gases consist of carbon monoxide (10–15%), hydrogen (5–20%) and carbon dioxide (1–10%) with the balance of the gas being nitrogen. The ash remaining from this process consists of metallic oxides with trace quantities of carbon-based compounds. Oxygen content is minimized in stage 1b to prevent oxidation of the carbon to carbon dioxide. The firebelt speed is controlled to ensure complete oxidation of the ash just before the end of the belt.

Radiative energy produced from stage 1b is reflected off of the refractory walls onto section 1a where it is used to gasify the solid fuel. Control of the section 1b process is performed by the firebelt 21 speed, stage 1b temperature, control of the air to fuel ratio through firebelt 21 as measured by the oxygen concentration and by the overall draft (negative pressure) of the combustor system.

Stage 2 combustion occurs within the firetube and within the boiler where the carbon monoxide and hydrogen gases are oxidized to carbon dioxide and water by the addition of additional air. The firetube is used for mixing of the air and fuel gas with final combustion occurring within the boiler cavity.

The Stage 2 combustion process is controlled by the air/fuel gas ratio, boiler temperature, firetube temperature, carbon monoxide concentration, oxygen concentration, carbon dioxide concentration and by the overall draft of the combustor system.

Pollution Control

The combustor of the invention is a remarkably simple combustion system, and it is very easy to minimize the air pollutants that are produced from the combustion of solid fuels. This is not the case with other combustor systems currently on the market. With two exceptions, the combustor disclosed herein is the only combustion system that does not require a gaseous fuel afterburner to remove excess pollutants. The remaining two combustion systems are on the order of ten times as expensive to accomplish the same degree of pollution control as the combustor of this invention.

There are five different categories of air pollutants that the Environmental Protection Agency regulates in solid fuel combustion systems. The combustor disclosed herein has been specifically designed to minimize the quantity of each five categories of pollutants. Each of these five categories will be discussed individually.

Particulates

Particulates are released into the atmosphere from materials in the fuel which cannot be burned. Usually these particles are a chemical part of the fuel and when burned, recombine as small particles. Part of these particles agglomerate together in chunks which then collect in the bottom of the combustor and are removed as bottom ash. The remaining particles are carried in the flue gas.

These particles could be released into the atmosphere unless they are removed. In the combustor of this invention, the particles are removed by a device called a baghouse. The baghouse is a large chamber filled with cloth bags that collect the dust as the gas passes through them. The dust is then removed and the cleaned gas can be released into the atmosphere.

The technology of baghouse design and construction is well advanced. There have been very few refinements in the baghouse particulate removal system since the mid-1970's.

Sulfur Dioxide

Sulfur oxides ($NO_x$) are produced by the nitrogen combining with oxygen in the presence of high temperatures. Generally, the higher the temperature, the higher the quantity of nitrogen oxides produced. Because nitrogen oxides have been found to be a contributing factor in the destruction of ozone in the atmosphere, the emission of these compounds are regulated and must be minimized.

For most solid fuel combustion sources, a system of reducing nitrogen oxides must be added to the combustor to lower the nitrogen oxide emissions to an acceptable level. This reduction system uses the injection of ammonia gas into the combustion system and a catalytic converter (similar to today's automobiles) to remove the nitrogen oxides and the ammonia. This is an expensive process, both in capital costs for the previous metal catalyst and for operating costs of ammonia injection. Additionally, another pollutant, ammonia, a highly toxic compound, has been introduced into the atmosphere which must be monitored.

The present combustor uses a different method to reduce nitrogen oxides. By closely controlling the amount of air that is introduced into the combustion process, the formation of nitrogen oxides is minimized. Nitrogen oxides cannot form if there is not oxygen to combine with the nitrogen. In the combustion process disclosed herein, only enough air is added to the fuel to perform the necessary combustion of the fuel. Because there is no additional oxygen, there are very low quantities of nitrogen oxides produced. Excess air is added only at the very end of the combustion process to ensure complete combustion of the fuel. Using this process, very low concentrations of nitrogen oxides are emitted into the atmosphere.

Carbon Monoxide

Carbon Monoxide (CO) is the result of incomplete combustion. This is due to either low combustion temperatures or insufficient combustion air. In the combustor of this invention, the combustion temperature exceeds 3,000° F. for all solid fuels and 4,000° F. using tires. To ensure that the combustion process is complete and no carbon monoxide remains, a small amount of excess air is added to the final stage of combustion. This results in low concentrations of carbon monoxide and low concentrations of nitrogen oxides, a feat unable to be accomplished by any other combustor without an afterburner or a catalytic converter.

Volatile Hydrocarbons

Volatile hydrocarbons or volatile organic carbons (VOC) are a class of compounds that are regulated by the Environmental Protection Agency. These compounds include a wide range of chemicals that can be emitted into the atmosphere. Included in this list are compounds like dioxins, polychlorinated biphenyls (PCBs), polynuclear aromatics (PNAS) and other hazardous air pollutants (HAPs).

These compounds are created as the result of incomplete combustion. In the combustor of this invention, the formation of these compounds are kept to an extremely low level, in many cases unmeasurable due to the extreme temperatures present in the combustion process. It is highly unlikely that the Environmental Protection Agency or any other environmental regulatory agency will pass in the foreseeable future, regulations governing the release of volatile hydrocarbons that the present combustor will be unable to meet.

Monitoring of Pollutants

Regulations in all states and in most countries require a facility to demonstrate that they are complying with the applicable air emission standards. To demonstrate compliance, a facility must usually install a system that continuously monitors the quality of the gas being released into the atmosphere. The system is called a Continuous Emission Monitoring System (CEMS).

Some of the parameters that are monitored include:
Particulates (opacity),
Sulfur dioxide,
Nitrogen oxides,
Carbon monoxide,
Volatile organic carbon,
Certain hydrocarbon species,
Hydrogen chloride,
Hydrogen fluoride,
Hydrogen sulfide.

The monitoring system continuously records the rate at which the pollutants are released into the atmosphere. These records must be submitted to the regulators to prove that the facility did indeed meet the required standards.

Combustor Control Description (FIGS. 7A, 7B and 7C)

The combustion control process is a series of nested control loops that provide the necessary regulation of heat production.

The primary loop that controls the heat production is regulated by the quantity of fuel that is admitted to the combustor. The fuel feed must have a wide range of quantities due to the variety of fuels used in the combustor.

Within the primary loop are combustion control loops that regulate the combustion process in Stages 1a, 1b and Stage 2. This is controlled by the speed of the combustion belts and the quantity of air added to the fuel as it is combusted. The goal of these control loops is to have the fuel completely consumed while maintaining the required pollution control.

All of the components controlled in the combustion system contain feedback to inform the control system if a component malfunctions. Different component types use different types of feedback; for example, the air control dampers include a position sensor so that the damper position set by the controller is returned to the controller. If the position of the damper differs from the setpoint, the operator is informed and if the error is beyond a certain limit, the combustor is shut down.

Where possible, the control system is designed so that minor component malfunctions are either self-corrected or the programming compensates for the error. If minor errors are noted by the control system, the system operator and system maintenance personnel are notified for repair or replacement. This gives the control system a great deal of intelligence including, where possible, predictive failures.

In summary, the following parameters are used to control the combustion process:

Stage 1a:
Solid fuel feed rate,
Air flow rate,
Oxygen concentration,
Firebelt 20 speed,
Gasification temperature,
Draft pressure.

Stage 1b:
Air flow rate,
Oxygen concentration,
Firebelt 21 speed,
Oxidation temperature,
Draft pressure.

Stage 2:
Air flow rate,
Oxygen concentration,
Carbon dioxide concentration,
Carbon monoxide concentration,
Firetube draft pressure,
Firetube temperature,
Boiler draft pressure,
Boiler temperature.

While the invention has been described in relation to preferred embodiments of the invention, it will be appreciated that various other embodiments, adaptations and modifications of the invention will be readily apparent to those skilled in the art.

What is claimed is:

1. A solid fuel fed combustor system comprising:
a first chamber portion having an inlet feed for feeding a metered amount of a solid fuel thereto,
a first burner stage having a first traveling conveyor firebelt with a first air introducing means for introducing a metered amount of air in progressively increasing proportion along the length of said first traveling conveyor to cause endothermic decomposition of said solid fuel,
a second burner stage having a second traveling conveyor firebelt with a second air introducing means for introducing air in a progressively decreasing amount along the length of said second traveling conveyor firebelt and to cause exothermic decomposition of solid fuel received from said burner stage,
first chamber portion having a sloped common roof section common to said burner stages and made of radiative energy reflective fire brick, said roof section being angled to reflect radiative energy generated from fuel traveling on said traveling conveyor firebelts and to direct said radiative energy onto fuel traveling on said first firebelt, and
means for controlling air introduced to said burner stages.

2. The solid fuel fed combustor system defined in claim 1, wherein said means for controlling air is adapted to automatically minimize excess air to said firebelts so as to minimize production of carbon monoxide and nitrogen oxides during combustion of solid fuel.

3. A solid fuel fed gasification system comprising:

a first chamber portion having an inlet feed for feeding a metered amount of a solid fuel thereto, a first burner stage having a first traveling conveyor firebelt with a first air introducing means for introducing a metered amount of air progressively increasing proportion along the length of said first traveling conveyor, an additional burner stage having an additional traveling conveyor firebelt with a second air introducing means for introducing air in a progressively decreasing amount along the length of said further traveling conveyor firebelt, said first chamber portion having a sloped roof section common to said burner stages and made of radiative energy reflective fire brick for reflecting radiative energy generated from fuel traveling on said traveling conveyor firebelts and for directing said radiative energy onto fuel traveling on said first firebelt.

* * * * *